US012688985B2

(12) United States Patent
Chen et al.

(10) Patent No.: US 12,688,985 B2
(45) Date of Patent: Jul. 21, 2026

(54) KEY STRUCTURE OF ELECTRONIC DEVICE

(71) Applicant: Merry Electronics(Shenzhen) Co., Ltd., ShenZhen (CN)

(72) Inventors: Chun-Han Chen, Taichung (TW); Tien-Fu Huang, Taichung (TW); Chih Wei Wang, Taichung (TW); Wan Hsiu Hsieh, Taichung (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 238 days.

(21) Appl. No.: 18/522,288

(22) Filed: Nov. 29, 2023

(65) Prior Publication Data

US 2025/0149268 A1 May 8, 2025

(30) Foreign Application Priority Data

Nov. 3, 2023 (TW) ................................ 112142406

(51) Int. Cl.
*H01H 13/02* (2006.01)
*H01H 13/14* (2006.01)

(52) U.S. Cl.
CPC .......... *H01H 13/023* (2013.01); *H01H 13/14* (2013.01)

(58) Field of Classification Search
CPC ................. H01H 13/023; H01H 13/14; H01H 2219/036; H01H 2219/062; H01H 13/83; H01H 3/12; H01H 13/70; H01H 2221/044; H01H 2215/044; H01H 13/02
See application file for complete search history.

(56) References Cited

U.S. PATENT DOCUMENTS

| | | | | |
|---|---|---|---|---|
| 8,759,702 | B2 * | 6/2014 | Huang | H01H 3/125 200/344 |
| 9,728,350 | B2 * | 8/2017 | Müller | H01H 13/023 |
| 11,373,819 | B2 * | 6/2022 | Chiu | H01H 13/14 |

* cited by examiner

*Primary Examiner* — Lheiren Mae A Caroc
(74) *Attorney, Agent, or Firm* — JCIPRNET

(57) ABSTRACT

A key structure of electronic device including a substrate, a light source disposed on the substrate, an elastic member disposed on the substrate, and a key cap disposed on the elastic member is provided. The elastic member has a tunnel for passing light generated by the light source and projecting toward the key cap. An inner diameter of the tunnel gradually expands from the light source toward the key cap.

8 Claims, 5 Drawing Sheets

KEY STRUCTURE OF ELECTRONIC DEVICE

CROSS-REFERENCE TO RELATED APPLICATION

This application claims the priority benefit of Taiwan application serial no. 112142406, filed on Nov. 3, 2023. The entirety of the above-mentioned patent application is hereby incorporated by reference herein and made a part of this specification.

BACKGROUND

Technical Field

This disclosure relates to a key structure, and in particular to a key structure of an electronic device.

Description of Related Art

With the rapid development of electronic technology and information industry today, many electronic devices use keyboards or keys as their input devices. For luminous keyboards or luminous keys, they face the integration problem of component transmission and light transmission in structural design. Therefore, most of the current luminous keyboards or luminous keys adopt a design in which the light source is offset, that is, the light source is not at the center of the key structure. Although this can maintain the driving requirements of the key components, it results in offset and uneven illuminating effects. Simply speaking, due to the light source is not located right under the key cap, the light projected onto the key cap cannot be distributed evenly, which results in visual imbalance.

The above-mentioned uneven illumination causes the design of the pattern on the key cap being restricted. For example, designers nowadays usually would spray a light-shielding layer on the surface of the key cap, leaving out only the part with pattern to transmit light, so as to solve the problems caused by uneven illumination.

Based on the above, how to provide a light-emitting key that can take into account both component transmission and light transmission to relieve such design restrictions is actually an issue to be considered and resolved for those technicians in the art.

SUMMARY

The present disclosure provides a key structure of an electronic device, which allows light to be directly projected to the key cap through the elastic member, thereby achieving the best effects of both component transmission and light transmission.

The key structure of the electronic device of the present disclosure includes a substrate, a light source, an elastic member and a key cap. The light source is disposed on the substrate. The elastic member is disposed on substrate. The key cap is disposed on the elastic member. The elastic member has a tunnel for the light generated by the light source to be projected to the key cap through the tunnel, and the inner diameter of the tunnel gradually expands from the light source toward the key cap.

In light of the foregoing, the key structure is connected between the substrate and the key cap through the elastic member, so that the key cap can have the transmission (and restoring) function required for the key to be pressed through the elastic member. More importantly, the elastic member has a tunnel, and the inner diameter of the tunnel gradually expands from the light source toward the key cap, so that the light generated by the light source can be directly projected to the key cap through the tunnel. In this way, all the light generated by the light source can be projected to the key cap without any obstruction, so as to provide the visual effect of uniform illumination to the outer surface of the key cap.

DESCRIPTION OF THE EMBODIMENTS

Figure 1:
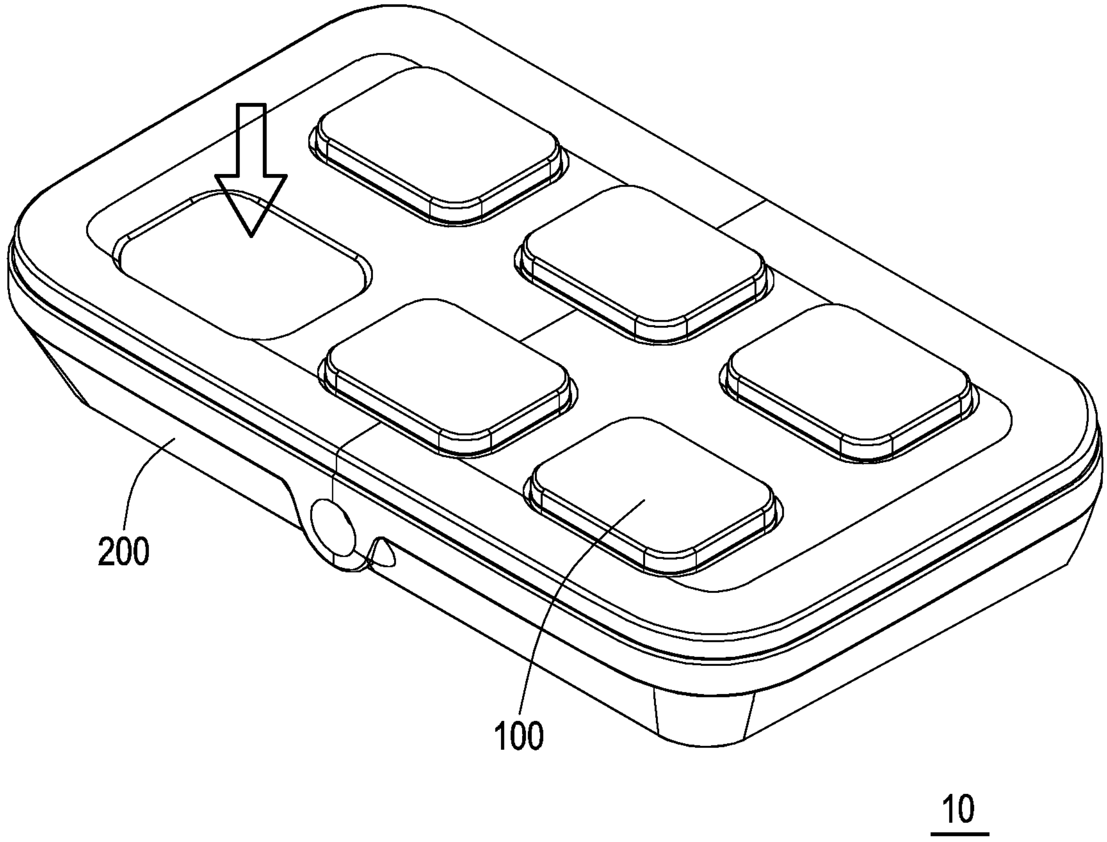
FIG. 1 is a schematic diagram of an electronic device according to an embodiment of the present disclosure.
Figure 2:
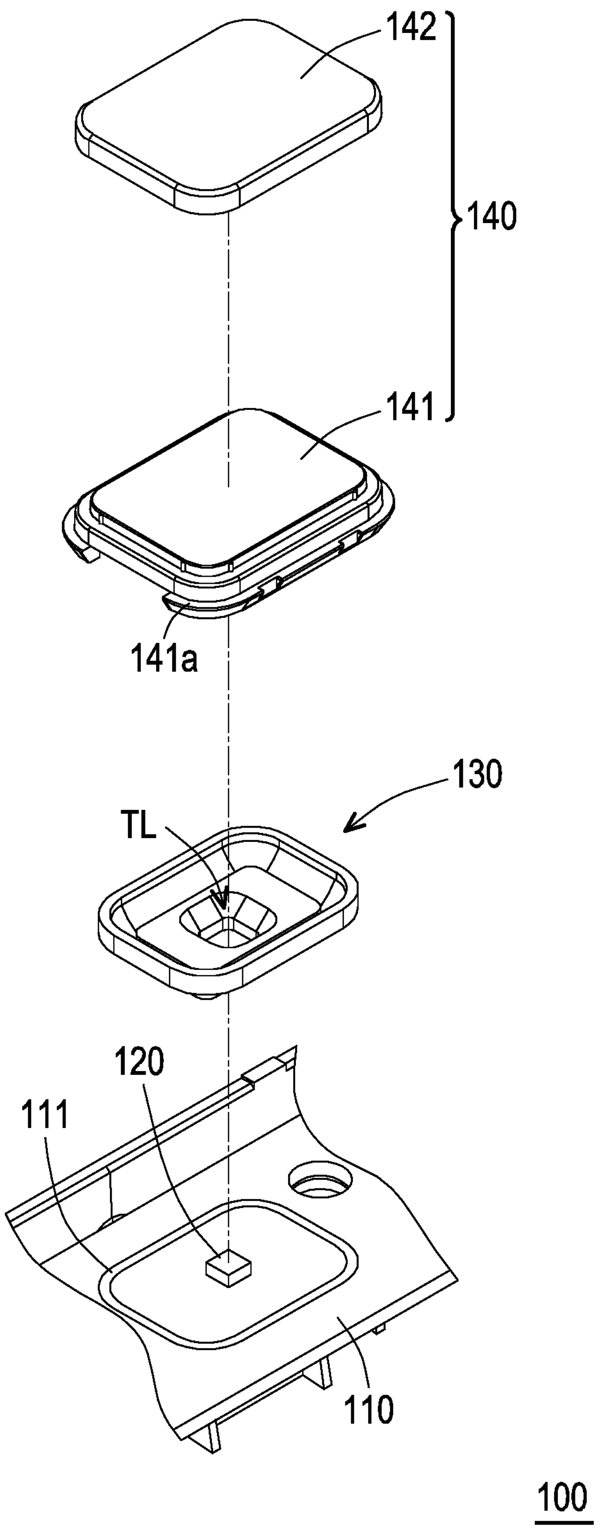
FIG. 2 is an exploded view of the key structure.

FIG. 1 is a schematic diagram of an electronic device according to an embodiment of the present disclosure. FIG. 2 is an exploded view of the key structure. Referring to both FIG. 1 and FIG. 2, in this embodiment, the electronic device 10 includes a casing 200 and a plurality of key structures 100 disposed on the casing 200, the key structure 100 includes a substrate 110, a light source 120, an elastic member 130 and a key cap 140. The substrate 110 is, for example, a circuit board, and the light source 120 is, for example, a light emitting diode, which is disposed on the substrate 110. The elastic member 130 is disposed on the substrate 110, and is made of rubber, for example. The key cap 140 is disposed on the elastic member 130. Furthermore, the elastic member 130 has a tunnel TL (illustrated in FIG. 2) for the light generated by the light source 120 to pass through the tunnel TL and be projected to the key cap 140, and an inner diameter of the tunnel TL gradually expands (increases) from the light source 120 toward the key cap 140. In response to the gradual expansion characteristics of the tunnel TL, the light from the light source 120 can be directly projected to the key cap 140 without any obstruction, so that the light can be projected onto the key cap 140 evenly without deviation. In a preferred embodiment, the trend of the tunnel TL can be appropriately adjusted according to the emission angle of the light source 120, that is, a gradual expansion angle of the tunnel TL is greater than or equal to the emission angle of the light source 120, so as to facilitate transmission of the light.

Figure 3A:
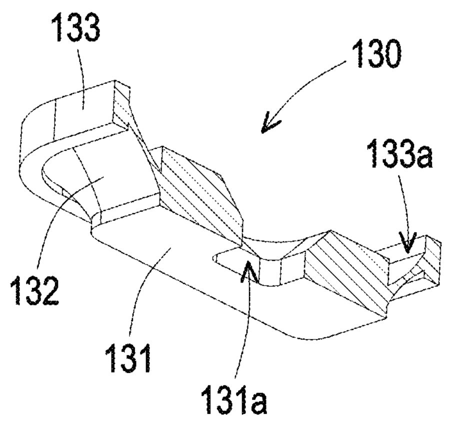
FIG. 3A, FIG. 3B illustrate partial cross-sectional views of the elastic member from different perspectives.
Figure 3B:
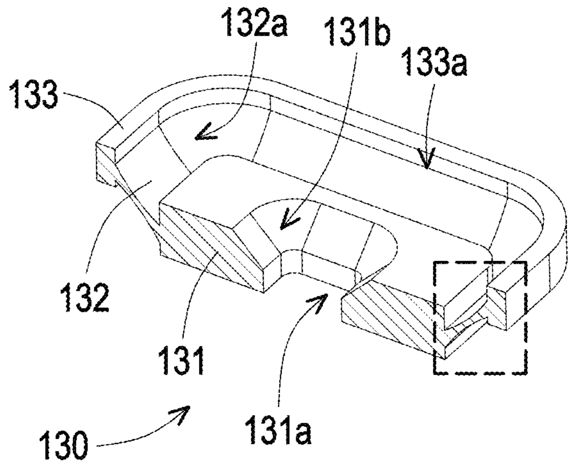
Figure 3C:
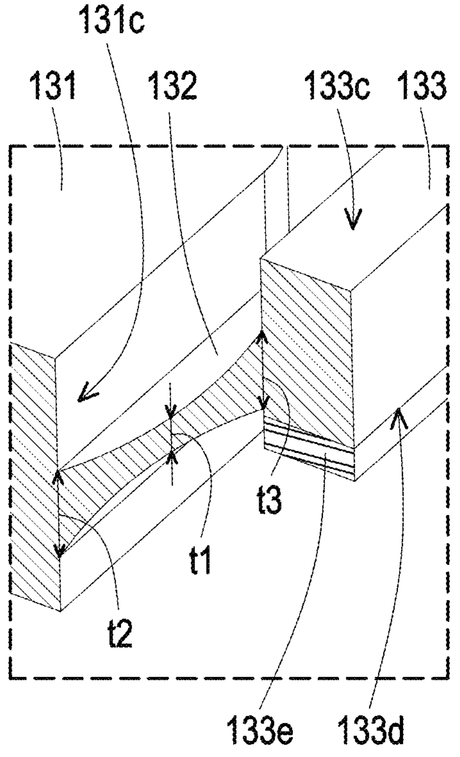
FIG. 3C is an enlarged view of FIG. 3B.

FIG. 3A and FIG. 3B illustrate partial cross-sectional views of the elastic member from different viewing angles to facilitate identification of the elastic member 130 shown in FIG. 2, and FIG. 3C is an enlarged view of FIG. 3B. Please refer to FIG. 2, FIG. 3A and FIG. 3B, in detail, the elastic member 130 of this embodiment leans against the substrate 110 and surrounds the light source 120 through the structure at an inlet 131*a* of the tunnel TL, and the elastic member 130 leans against the key cap 140 through the structure at an outlet 133*a* of the tunnel TL, wherein the substrate 110, the elastic member 130 and the key cap 140 form a closed space. The inner diameter of the inlet 131*a* is smaller than the inner diameter of the outlet 133*a*, so that the elastic member 130 can be seen as a cup-shaped body, or seen as an inverted dome member due to its V-shaped outline that is narrow at the bottom and wide at the top. Herein, the substrate 110 is regarded as the bottom and key cap 140 is regarded as the top.

Furthermore, as shown in FIG. 3A, FIG. 3B, and FIG. 3C, the elastic member 130 has a base portion 131, a crumple portion 132 and an abutment portion 133. When the elastic member 130 is disposed on the substrate 110 and surrounds the light source 120, the base portion 131, the crumple portion 132 and the abutment portion 133 can be seen as being centered around the light source, sequentially stacked layer by layer from the substrate 110 toward the key cap 140 and away from the light source 120. The base portion 131 leans against the substrate 110, the crumple portion 132 abuts between the base portion 131 and the abutment portion 133, and the abutment portion 133 leans against the key cap 140 constantly (permanently). The base portion 131 has a first sloping sidewall 131*b* that forms a part of the tunnel TL and an outer sidewall 131*c* facing away from the first sloping sidewall 131*b*. The crumple portion 132 has a second sloping sidewall 132*a* that forms another part of the tunnel TL, and the second sloping sidewall 132*a* extends from the outer sidewall 131*c* and connected to the abutment portion 133

Figure 4:
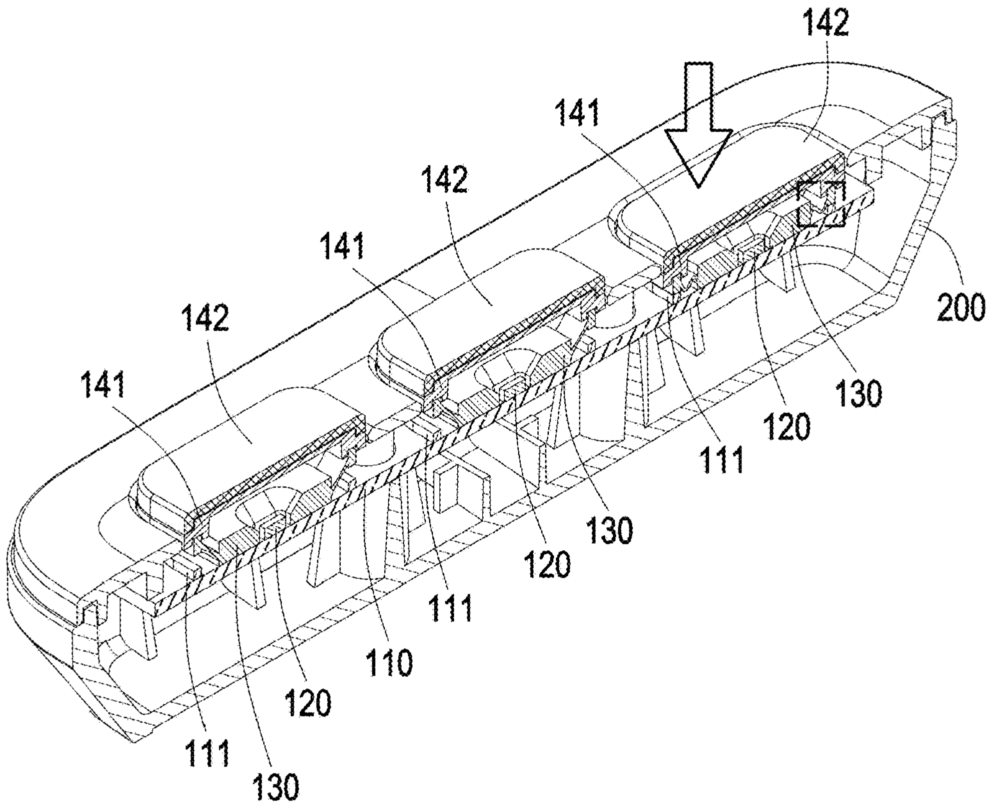
FIG. 4 and FIG. 5 are cross-sectional views of the electronic device at different positions.
Figure 4A:
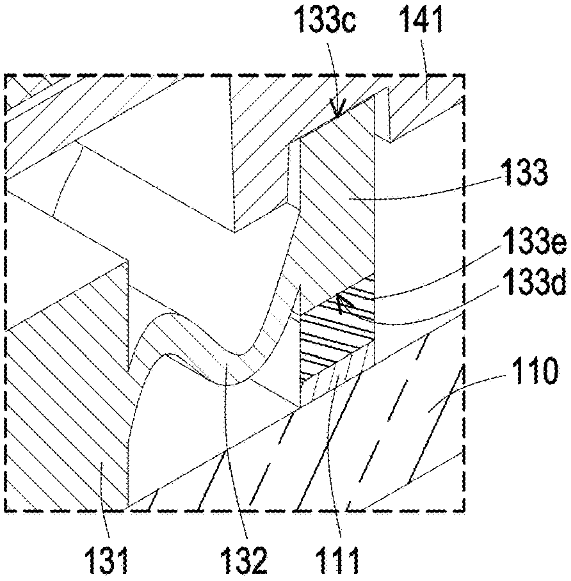
FIG. 4A is an enlarged view of FIG. 4.
Figure 5:
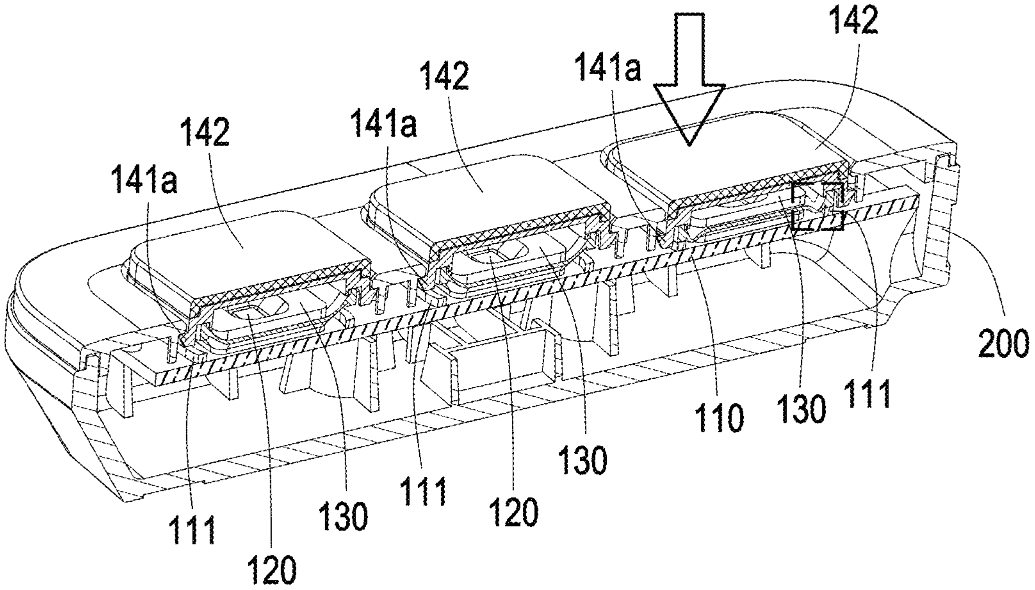
Figure 5A:
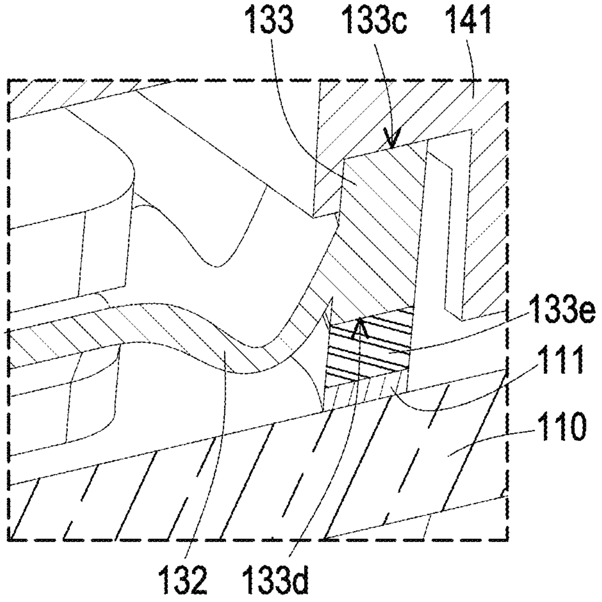
FIG. 5A is an enlarged view of FIG. 5.

In addition, FIG. 4 and FIG. 5 illustrate cross-sectional views of the electronic device at different positions, FIG. 4A is an enlarged view of FIG. 4, and FIG. 5A is an enlarged view of FIG. 5. Referring to FIG. 3C, FIG. 4, FIG. 4A, FIG. 5, and FIG. 5A, the abutment portion 133 has a top surface 133*c* and a bottom surface 133*d* that are opposite to each other. The top surface 133*c* is constantly in contact with the key cap 140, the bottom surface 133*d* faces the substrate 110, and the elastic member 130 would deform and accumulate elastic force when the key cap 140 is pressed, wherein the crumple portion 132 would deform and cause the bottom surface 133*d* of the abutment portion 133 leans against the substrate 110. Furthermore, the elastic member 130 also has a first conductive layer 133*e*, which is disposed on the bottom surface 133*d* of the abutment portion 133, and correspondingly, the substrate 110 has a second conductive layer 111 facing the bottom surface 133*d* of the abutment portion 133. Therefore, when the key cap 140 is pressed and the elastic member 130 is deformed, the first conductive layer 133*e* abuts and electrically connect the second conductive layer 111 to complete triggering of electronic signals.

In addition, FIG. 4 and FIG. 5 illustrate cross-sectional views of the electronic device at different positions. Referring to FIG. 3B, FIG. 4, and FIG. 5, the abutment portion 133 has a top surface 133*c* and a bottom surface 133*d* that are opposite to each other. The top surface 133*c* is constantly in contact with the key cap 140, the bottom surface 133*d* faces the substrate 110, and the elastic member 130 would deform and accumulate elastic force when the key cap 140 is pressed, wherein the crumple portion 132 would deform and cause the bottom surface 133*d* of the abutment portion 133 leans against the substrate 110. Furthermore, the elastic member 130 also has a first conductive layer 133*e*, which is disposed on the bottom surface 133*d* of the abutment portion 133, and correspondingly, the substrate 110 has a second conductive layer 111 facing the bottom surface 133*d* of the abutment portion 133. Therefore, when the key cap 140 is pressed and the elastic member 130 is deformed, the first conductive layer 133*e* abuts and electrically connect the second conductive layer 111 to complete triggering of electronic signals.

It should also be mentioned that a thickness t2 of the crumple portion 132 abutting the base portion 131 is greater than a thickness t1 at the center of the crumple portion 132, and a thickness t3 of the crumple portion 132 abutting the abutment portion 133 is greater than the thickness t1 at the center of the crumple portion 132. Accordingly, the center of the crumple portion 132 becomes the weakest point of the structure, such that, when the elastic member 130 is pressed, a main deformation point of the elastic member 130 can be restricted to the center of the crumple portion 132. The location of crumple is not limited here and can be adjusted according to the required feel of the key structure 100.

Referring to FIG. 2 and FIG. 5, in this embodiment, the key cap 140 includes a first component 141 and a second component 142. The first component 141 leans against the elastic member 130 and is movably clasp onto the casing 200 of the electronic device 10 through the stopper edge 141*a*. The second component 142 is detachably disposed on the first component 141. Accordingly, the first component 141 is considered to be movably assembled to the casing 200 without falling off, while the second component 142 can be replaced or repaired according to the user's needs. As such, the key cap 140 has a wider range of applications.

Furthermore, at least one of the first component 141 and the second component 142 has a diffusion agent and is translucent. Accordingly, with the corresponding configurations of the light source 120 and the elastic member 130 described above, the light source 120 can be regarded as being disposed right under the key cap 140, and the characteristics of the gradual expansion structure of the tunnel TL may also allow light to be directly projected to key cap 140. In this way, with the diffusion agent of the first component 141 and the second component 142, the light projected onto the key cap 140 can be evenly scattered, so that the key cap 140 presents evenly distributed halo visual effect.

In other not illustrated embodiments, the elastic member may further be chosen to have different colors according to requirements of light. For example, if more scattering or reflection of the light is required, a white elastic member can be chosen to facilitate further reflection of light when the light is projected onto the elastic member, thus improving the utilization of light. On the contrary, a black elastic member can be chosen to absorb the light projected to the elastic member.

To sum up, in the above embodiments of the present disclosure, the key structure adopts the elastic member leaning between the substrate and the key cap, so that the key cap can have the transmission (pressed to deform and restore) function required for the key to be pressed through the elastic member. More importantly, the elastic member has a tunnel, and the inner diameter of the tunnel gradually expands from the light source toward the key cap, so that the light generated by the light source can be directly projected to the key cap through the tunnel. In this way, all the light generated by the light source can be projected to the key cap without any obstruction, so as to provide the visual effect of uniform illumination on the outer surface of the key cap.

In response to the tunnel of the elastic member in need to cooperate with light transmission, the key structure further utilize the abutment portion stacked outside as a press trigger, wherein the substrate is provided with a second conductive layer, and the outermost abutment portion of the elastic member has a first conductive layer 133*e* facing the substrate, so as to abut to each other and be electrically conductive when being pressed. Accordingly, the key structure can smoothly perform the functions of structural transmission and light transmission through the above-mentioned structural characteristics of the elastic member.

What is claimed is:

1. A key structure of an electronic device, comprising:

a substrate;

a light source disposed on the substrate;

an elastic member disposed on the substrate; and a key cap disposed on the elastic member, wherein the elastic member has a tunnel for light generated by the light source to be projected to the key cap through the tunnel, and an inner diameter of the tunnel is gradually expanded from the light source toward the key cap, wherein the elastic member has a base portion, a crumple portion and an abutment portion, which are centered around the light source, sequentially stacked layer by layer from the substrate toward the key cap and away from the light source, the base portion leans against the substrate, the crumple portion connected between the base portion and the abutment portion, and the abutment portion leans against the key cap constantly, wherein the abutment portion has a top surface and a bottom surface opposite to each other, the top surface is constantly leaning against the key cap, the bottom surface faces the substrate, and, when the key cap is pressed, the crumple portion deforms so that the bottom surface leans against the substrate.

2. The key structure of the electronic device as claimed in claim 1, wherein the elastic member leans against the substrate through a structure at an inlet of the tunnel and surrounds the light source, the elastic member leans against the key cap through a structure at an outlet of the tunnel, the substrate, the elastic member and the key cap form a closed space, and an inner diameter of the inlet is smaller than an inner diameter of the outlet.

3. The key structure of the electronic device as claimed in claim 1, in which an expanding angle of the tunnel is greater than or equal to an emission angle of the light source.

4. The key structure of the electronic device as claimed in claim 1, wherein a thickness of a portion of the crumple portion abutting the base portion is greater than a thickness of a center of the crumple portion, and a thickness of a portion of the crumple portion abutting the abutment portion is greater than the thickness of the center of the crumple portion.

5. The key structure of the electronic device as claimed in claim 1, wherein the elastic member has a first conductive layer disposed on the bottom surface, and the substrate has a second conductive layer facing the bottom surface, so that the first conductive layer is abutting and electrically conductive to the second conductive layer when the key cap is pressed.

6. The key structure of the electronic device as claimed in claim 1, wherein the base portion has a first sloping sidewall that forms a part of the tunnel and an outer sidewall facing away from the first sloping sidewall, the crumple portion has a second sloping sidewall that forms another part of the tunnel, and the second sloping sidewall extends from the outer sidewall and is connected to the abutment portion.

7. The key structure of the electronic device as claimed in claim 1, wherein the key cap comprises a first component and a second component, the first component leans against the elastic member and is movably clasped onto a casing of the electronic device, and the second component is detachably disposed on the first component.

8. The key structure of the electronic device as claimed in claim 7, wherein at least one of the first component and the second component has a diffusion agent and is translucent.

* * * * *